May 2, 1933.  L. J. FRIEDL  1,906,566
PROCESS AND APPARATUS FOR FORMING ARTICLES OF PLASTIC CLAY
Filed Jan. 18, 1930  4 Sheets-Sheet 2

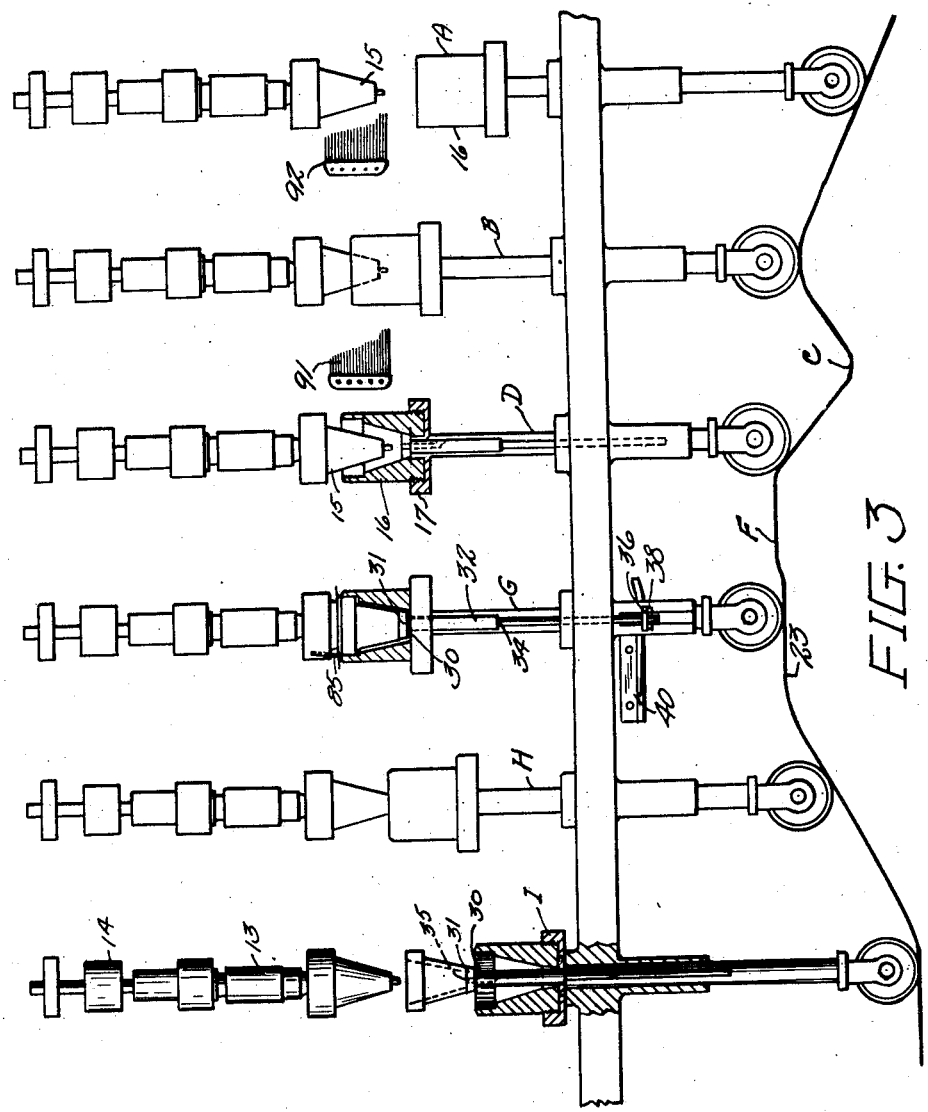

May 2, 1933. L. J. FRIEDL 1,906,566
PROCESS AND APPARATUS FOR FORMING ARTICLES OF PLASTIC CLAY
Filed Jan. 18, 1930  4 Sheets-Sheet 4
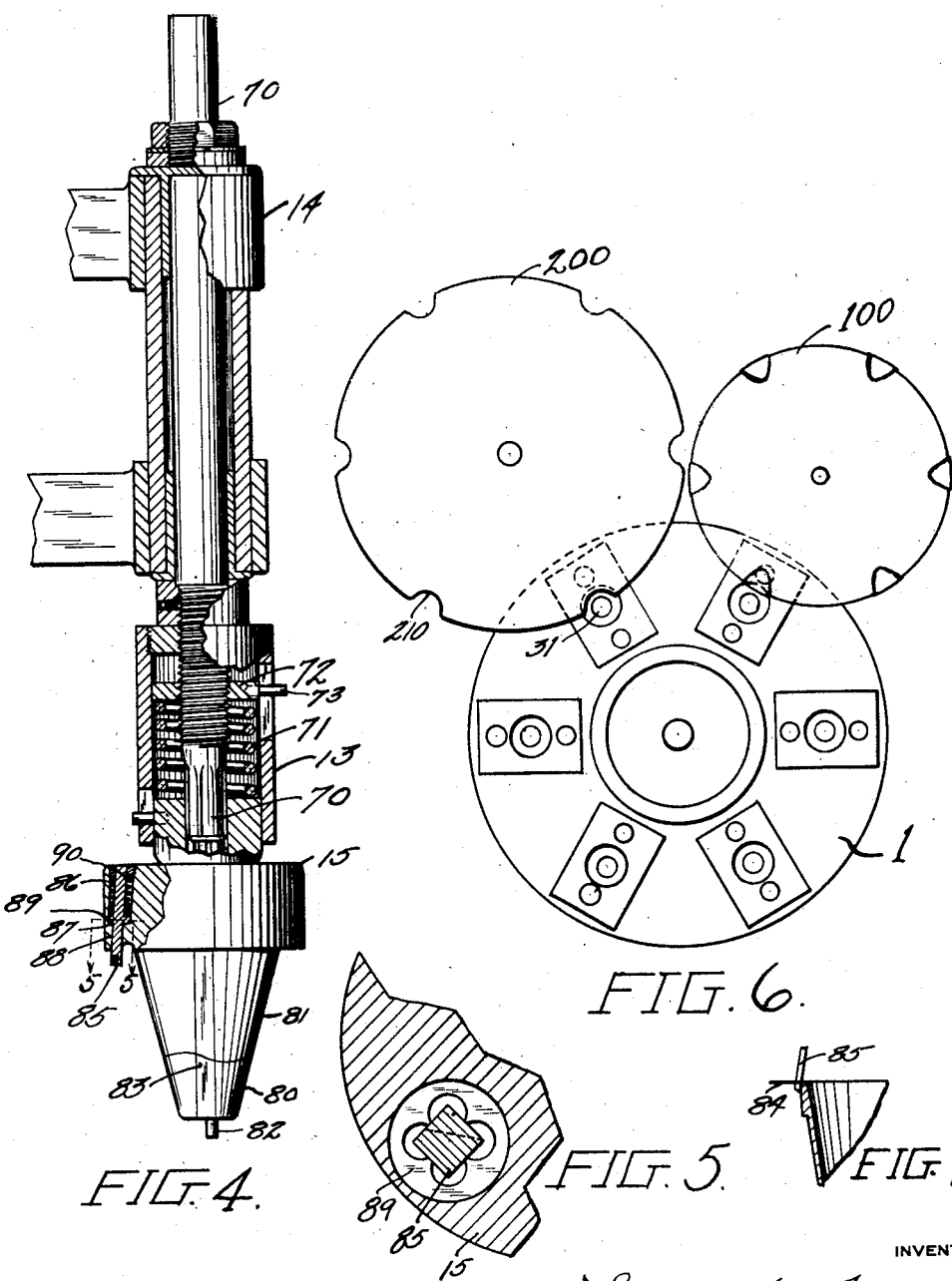

Patented May 2, 1933

1,906,566

UNITED STATES PATENT OFFICE

LOUIS J. FRIEDL, OF CLEVELAND, OHIO

PROCESS AND APPARATUS FOR FORMING ARTICLES OF PLASTIC CLAY

Application filed January 18, 1930. Serial No. 421,704.

This invention relates to a continuous process and automatic apparatus for forming articles of plastic clay.

The various machines now used in modeling articles of plastic clay require an operator to handle the product while soft and fresh from the mold. The careful handling required to prevent distortion of the product results in slowing down production. The present machines are of a single operation type requiring constant attendance by an operator.

It is one of the objects of my invention to eliminate manual operation and the handling of the soft freshly formed product.

Another object is to produce a completely finished and trimmed product by means of a machine which is continuous in its operation and capable of relatively very high production.

Another object is to produce a more uniform product.

Still another object is the provision of means for automatically supplying lubricant to the mold members and to the article at predetermined intervals with relation to the formation of each article, and in such quantities as to secure best results in formation and removal of the ware.

In the drawings, Fig. 1 is a sectional view of the molding mechanism of my apparatus showing the feeding mechanism therefor;

Fig. 3 is a somewhat diagrammatic development of the mold and spindle carrier and cam illustrating the relation of various steps in my process and the operation of my apparatus;

Fig. 4 is an axial sectional view through one of the molding spindles of the machine;

Fig. 5 is a partial sectional view taken on a plane indicated by the line 5—5 of Fig. 4;

Fig. 6 is a diagrammatic plan showing the location of the feeding and discharge mechanisms relative to the molding mechanism;

Fig. 7 is a partial sectional view of a molded pot before it is trimmed.

Figure 1:
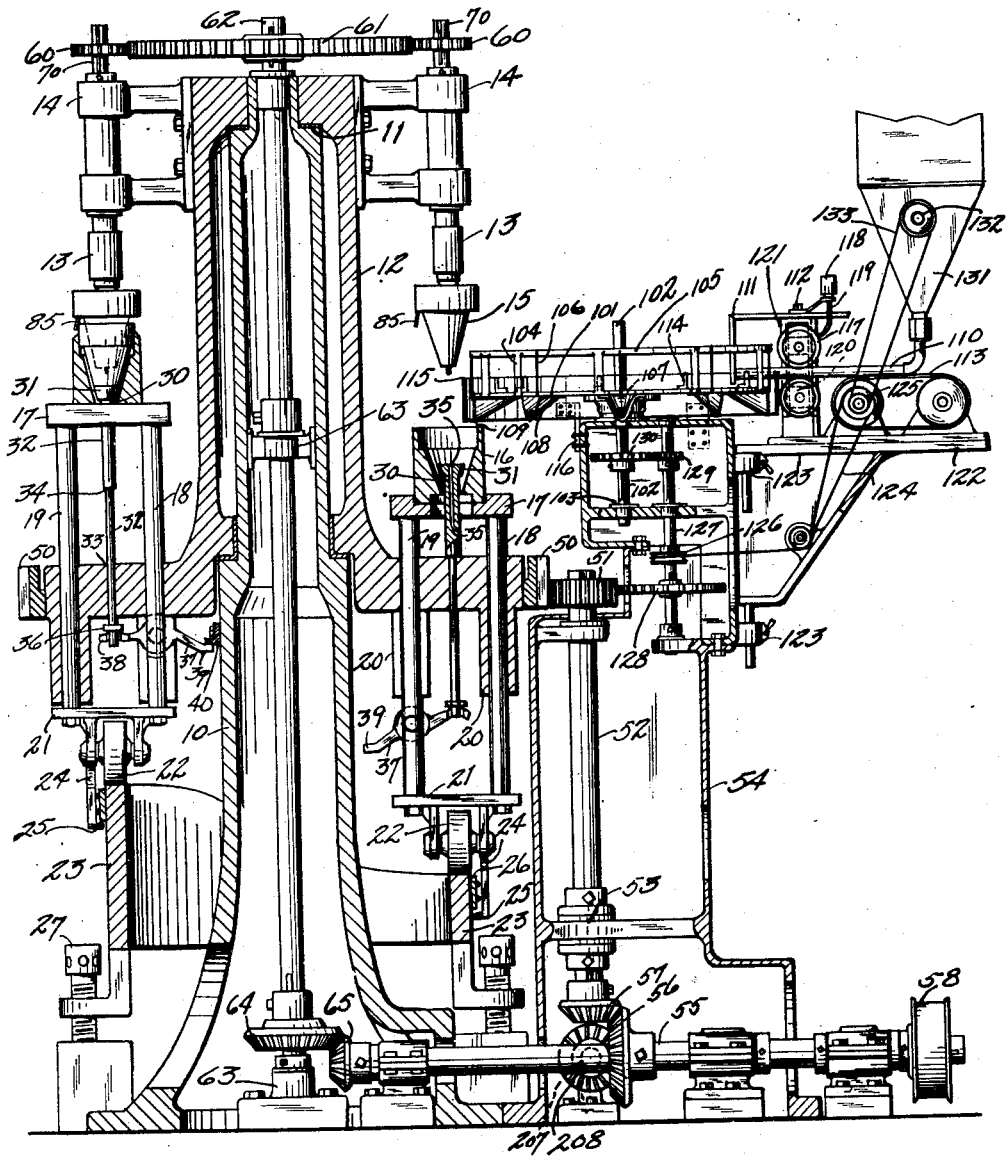

For carrying out my process, I provide an apparatus including a molding mechanism 1, a cooperating feeding mechanism 100, and a cooperating discharge mechanism 200. For the purpose of illustration I shall describe a form of my invention adapted for manufacturing flower pots.

My molding mechanism includes an upright frame 10, portions of which form bearings 11, on which is rotatably mounted a turret 12. A plurality of rotatable spindles 13 are carried in bearings 14 rigidly secured to the turret 12. Each of the spindles carries a core 15 rotatable therewith. Complementary molds 16, axially aligned with the cores and adapted for relative movement axially toward and away from the cores, are detachably mounted on carrier members 17. Thus the molds are carried on rods 18 and 19 slidable in suitable sleeves 20 of the turret 12. Convenient means for actuating the rods 18 and 19 include a bearing 21 secured to the rods and carrying a cam roller 22, adapted to ride on the track of a cam 23. The cam 23 is designed to actuate the cam rollers 22 to cause relative axial movement of the molds 16 and their cooperating cores toward and away from each other at predetermined positions as the turret 12 revolves.

To insure separation of the molds and cores, an arm 24, having a follower 25, may be secured to the bearing 21. The follower engages the underside of a cam track 26, shown as formed by securing a metal band about the cam track 23, to pull the mold downward. The cam 23 is mounted upon adjusting screws 27, for the purpose of raising and lowering the track to vary the thickness of the product and compensate for the differences in molds or the cores. Each of the molds is provided with an ejector 30 for removing the molded product therefrom. A suitable ejector, as shown, includes a head 31 beveled to fit the inner contour of the mold so as to form the bottom thereof during molding. The head 31 is mounted on a rod 32 slidable in an opening 33 in the turret 12. On the rod 32 is a shoulder 34 adapted for engagement with a portion of the upper surface of the turret 12 to stop downward movement of the ejector at a predetermined position of the mold as the mold moves downward.

The ejector head 31 and shaft 32 are vented as at 35, to form a passage from within the mold to the outside. The vent 35 permits passage of excess material, some of which results from forming an opening in the base of the product, out from the mold. The ejector 30 also may be used to separate the mold and pot slightly so that the thin annular fin which often forms about the upper and outer circumference of the product between the core and mold may be trimmed off.

A convenient means for actuating the ejector to obtain the separation for trimming is illustrated and includes a collar 36 secured to the rod 32. A lever 37 pivotally mounted in the rods 19 carries a yoke 38 at one end, which engages the underside of the collar 36. The other end of the lever 37 is provided with a follower 39, which engages a cam 40 secured to the upright frame 10. This cam and lever are such that when the mold lowers slightly from its upper and molding position to the trimming position, the yoke 38 engages the collar 36 and holds the ejector 30 raised relative to the molds a slight amount to force the finished product relatively upward in the mold cavity, so that a small portion protrudes above the mold. Slots may be provided in the sleeves 20 to permit passage of the lever 37 as the rods 19 raise and lower.

The turret 12 is rotated preferably by a suitable annular gear such as 50, secured about the turret and driven by a cooperating gear 51. The gear 51 is rigidly secured on a shaft 52, rotatably mounted in suitable bearings 53 in a housing 54. The shaft 52 is rotated by a main driving shaft 55 through suitable bevel gears 56 and 57. The main driving shaft may be driven from any suitable power means, for instance, by a belt operating on the pulley 58.

Each of the spindles 13 is rotated by a gear 60 secured on the spindle shaft 70, and in engagement with a main driving gear 61 mounted on a shaft 62. The shaft 62 is rotatable in suitable bearings 63 in the upright frame 10, and is actuated by means of a bevel gear 64 engaging the complementary driving gear 65 on the main driving shaft 55.

The spindles 13 may be of the usual type, as illustrated in Fig. 4. As shown, the core 15 is slidably splined onto a spindle shaft 70. This allows axial movement of the core to relieve excessive strains, in case foreign matter should jam the mold. To regulate the pressure at which this action occurs, a spring 71 is secured between the core 15 and an adjustable collar 72 threaded onto the shaft 70 and secured against rotation by a suitable screw 73. The core 15 is preferably of the sectional type, the lower section 80 and upper section 81 being normally held separated a slight amount by a spring, not shown. The lower section 80 is provided with a projection 82 to form the opening in the bottom of the pot.

When the mold and core are in molding positions, the projection 82 rests upon the bottom of the mold or the ejector head 31, and sections 80 and 81 are forced together. As the mold and core are separated, the sections separate a slight amount, thus freeing the product from the core. To prevent undue suction between the core and the finished product, the customary flattened portion 83 is provided on the surface of the core to permit entrance of the air.

As illustrated in Fig. 7, a small fin 84 often forms on the upper edge of the product between the mold and core 15. A convenient means for removing this fin includes a knife or trimmer 85, which is slidable in the upper or head portion of the core 15. As illustrated, an opening 86 may be provided in the head of the core 15. The opening 86 is contracted at the lower end, as at 87, to form a guide portion 88 for the trimmer 85, and a shoulder 89, which engages a complementary shoulder on the trimmer, to stop the outward movement of the trimmer at a predetermined position.

Ordinarily it is desirable that the knife be put at a slight angle to the axis of the core, so that the centrifugal force will cause the trimmer to slide outwardly from the head as the mold is lowered. To insure more positive action, a spring 90 may be provided to actuate the knife. To prevent jamming of the knife in the slots 86 and 87, portions of the shoulder in the head may be cut away so as to form three or four knife edge guides for the trimmer, as illustrated in Fig. 5. This insures free action of the knife, even though clay should enter the slot 87.

In order to oil the cores at the required positions, I provide brushes such as 91 and 92 supported on a suitable arm 93, and arranged so that they brush across the cores when the cores are free from the molds. Oil is fed to these brushes from a reservoir 94 through suitable conduits 95. The amount of oil may be regulated by the usual valve so that only the amount actually needed is used, and excessive lubrication and waste of lubricant is eliminated.

The spindle bearings preferably are secured by locking screws 96, so that the spindles can be raised or lowered to accommodate different sizes of cores and molds. The gears 60 and 61 likewise may be raised or lowered on their shafts to correspond to the changed position of the spindles.

To feed material to the molding mechanism I provide a cooperating feeding mechanism including a cutting table 101 mounted on a shaft 102 rotatable in suitable bearings, such as 103 in the housing 54. At separated points about the cutting table are upright posts 104 which carry an annular band 105 spaced from the cutting table. Suitable cutters may be provided by stretching wires 106 from the cutting table to the annular band 105.

Openings 107 are made in the cutting table at points adjacent to the cutting wires 106. Secured to the underside of the table in radial alignment with these openings are chutes 108 which slope downward outwardly. These chutes are preferably of such length that their discharge ends fall above the cavities of the molds 16 when the chutes are aligned therewith, as shown at 109.

The clay stock 110 may be fed in any suitable strip between the cutting table and annular band 105 past the line of movement of the wires 106 by suitable means such as a belt conveyor 113. The amount of clay to be cut off from the stock strip may be regulated by a metering arm 111 adjustable longitudinally of the clay stock 110 and secured at the desired position by a screw 112 to limit the amount of stock to be severed.

As the cutting table 101 revolves, lengths of the clay stock are cut off by the wires 106. The upright posts 104 and pushers 114 insure separation of cut-off portions of the clay and guide them so that they fall into the chutes 108. An annular retaining band 115 extends part way about the circumference of the cutting table and prevents the clay from falling out of the chutes.

This band may be supported by suitable brackets 116 secured to the housing 54. The retaining band 115 ends at the point where the chutes pass above mold cavities, as at 109, so that the clay may fall out of the chutes into the mold cavities. Though tiltable chutes or other feeding means may be employed, the means described are very satisfactory in that they have very few movable parts which for efficient operation would require protection from the clay.

It is desirable to brush a film of oil onto the clay as it passes onto the cutting table, to prevent it from sticking to the table and to lubricate the forming surface of the mold. To accomplish this, there are provided a number of guide rollers 117. The circumferences of the guide rollers are preferably covered with a soft material such as wool. Oil is fed onto these rollers from a convenient source, such as a reservoir 118 through a conduit 119. The rollers are supported in bearings 120, slidable in a frame 121 for adjustment to accommodate different size of clay stock. The frame 121 may be carried by the table 122 mounted in brackets 123 on a housing 54.

The belt conveyor may likewise be carried on the adjustable table 122. A convenient means to drive the conveyor at a proper speed relative to the cutting table is illustrated in Fig. 1 and includes a belt 124 driving a pulley 125 of the conveyor and in turn driven by a pulley 126 on the shaft 127. This shaft is mounted in suitable bearings in the housing 54 and carries the gear 128, which may be operated by engagement with the gear 51. A gear 129 carried by the shaft 127 engages a gear 130 on the shaft 102 and cooperates therewith to rotate the cutting table 101.

As shown, the various gears are of such size and position that the turret 12 and table 101 rotate in opposite directions synchronously bringing each chute in order above a mold cavity and continuing this relative position of the chute and mold for a sufficient distance of travel to allow the contents of the chute to drop into the mold with which it is aligned.

Likewise, demountable pulleys may be used to drive the conveyor so that any desirable rate of feed of the clay is obtained. In such case a meter arm 111 may be dispensed with and a pug mill 131, located so as to extrude a continuous strip of clay directly onto the conveyor belt, may be used. The pug mill may be operated by a pulley 132 of a suitable size to operate the pug mill at a desired rate of speed. The pulley 132 may be driven by any suitable means such as a belt 133 engaging the pulley 125 of the conveyor. The housing 54 encloses the gearing mechanism and shields it from falling clay or any other material, at the same time protecting the operator.

As soon as the product is molded to the required form, it is desirable to remove it from the molding mechanism with as little handling as possible, due to the fact that it is exceedingly soft and easily distorted. To accomplish this purpose I provide a discharge mechanism 200, which cooperates with the ejector 30 above described.

This mechanism includes a discharge table 201 carried by a shaft 202 rotatable in suitable bearings 203 in the housing 204. This shaft carries a beveled gear 205 and is rotated by cooperation of this gear with a beveled gear 206 on shaft 207, which in turn is rotated by a gear 208, cooperating with the gear 56 of the main driving shaft 55.

Figure 2:
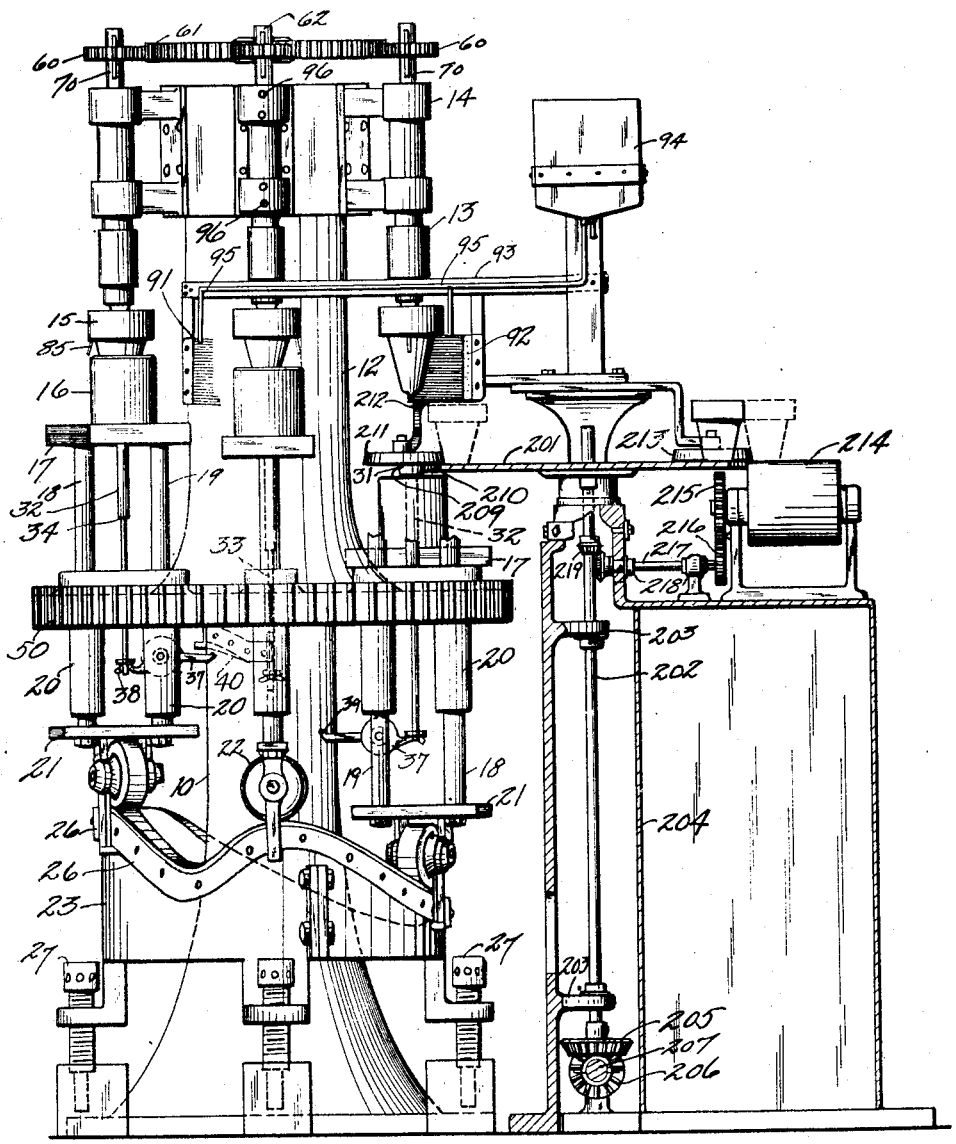
Fig. 2 is an elevation of the molding mechanism also showing the discharge mechanism.

As shown in Fig. 2, the discharge table is of such height that its upper surface lies in the same plane as the upper face of the ejector head 31, when the ejector and mold are relatively separated so that the ejector head is out of the mold cavity. The discharge table extends slightly beyond the ejector head 31 as at 209, notches 210 being provided therein to permit relative passage of the table and ejector heads. These notches are preferably shaped so that the discharge table fits closely about a portion of the ejector head, forming approximately a continuous surface from the ejector head onto the discharge table. The discharge table 201 and turret 12 are rotated in opposite directions, so that the ejector head and discharge table move relatively together along a portion of their path.

To remove the product from the ejector head 31 on which it rests at this relative position, it is only necessary to slide the product the width of its base along a smooth and substantially unbroken surface from the ejector head onto the discharge table. To accomplish this result with a minimum of abrasive action, I provide a pusher disk 211 rotatably supported on a suitable arm 212 secured to the housing 204. The pusher disk is preferably beveled to conform to the outer slope of the surface of the product at the points where it contacts therewith for pushing it from the ejector head onto the table.

Since the freshly molded product is very soft, it is desirable to make the pusher disk thin and locate it with its lower surface flush with the upper surface of the ejector head, so that the pressure between it and the molded product is directly aligned with the web forming the bottom wall of the product. This prevents distortion of the side walls. The contact surfaces of the pusher disks may be covered with a soft material, such as wool cloth.

The pusher disk 211 preferably is positioned with its center somewhat beyond the center of the ejector 30, so that as the table and ejector travel together, the pot strikes the pusher disk 211 between the center of the disk 211 and the discharge table 201. This deflects the pot from the ejector head onto the discharge table 201, where it is carried around until it reaches a second pusher disk 213, similar to the disk 211. The disk 213 is positioned with its center toward the center of the discharge table from the line of motion of the pot, so that it engages the pot and forces it off from the table onto a suitable conveyor such as the belt conveyor 214, which may carry it to any convenient place for further handling.

The conveyor 214 is preferably of such length that the product will dry slightly thereon, so that it may be more conveniently handled or removed. The conveyor may be driven by a suitable gear 215 engaging a gear 216 on a rotatable shaft 217 mounted in suitable bearings 218 in the housing 204. The shaft 217 may be driven in turn by the shaft 202 through a suitable bevel gear 219.

All of these gears are of such ratio and so located that cooperation of the discharge table 201, the turret 12 and the conveyor 214 is properly synchronized. The discharge mechanism 200 preferably is located a short distance before the feeding mechanism 100 so that as the finished product is discharged, the mold may be immediately refilled and the operation repeated.

The operation of my invention is clearly and briefly shown by reference to the diagrammatic development shown in Fig. 3. As there illustrated, the movement is from right to left. At position A the charge of clay has been introduced into the mold 16 by the feeding mechanism 100, and the mold has risen on the track of the cam 23. The core 15 is clear of the mold. While separated from the mold the spinning core 15 passes against the oiling brush 92 and receives a coating of oil. The movement to the left continues and the mold rises to position B, at which the core has entered the mold and partially formed the product. At this point the ejector is seated in the base of the mold. It is desirable to lubricate the core 15 again before final forming of the product. The mold is therefore lowered from the core at the lower portion C on the cam. When the core and mold are separated, the core spins against the second oiling brush 91 and is again coated with oil.

The mold then rises again as at D to final molding position as at F. It should be noted that at points B, C, D and F the ejector shoulder is clear from the turret 12, and the ejector head 31 is seated at the base of the mold. The movement to the left is continued until position G is reached, at which position the mold has dropped slightly away from the core.

Also at this position the follower 39 of the lever 37 engages the cam 40, causing the lever to force the ejector upward relative to the mold cavity so as to raise the upper edge of the pot slightly above the mold. The fin 84 is thus separated from the mold and core. At this point the trimmer 85 slides out from the core head a slight distance and spins around the upper edge of the pot, cutting off the fin from the product.

As the movement to the left continues the mold lowers on the cam 23 as shown at H. During the passage of the mold from the position H to I, the shoulder 34 of the ejector 30 engages the upper surface of the turret and stops the downward motion of the ejector, causing it to lift relative to the mold 16. The lever 37 has passed off of the cam 40 and remains in idling position.

When the position I is reached, the ejector has risen relative to the mold so that the ejector head 31 is above the mold cavity. While in this position the ejector head is engaged by the discharge table 201, and the pot moved onto this table, after which it is removed as described. Within a very short distance from the position at which the pot is removed from the mold, the mold starts rising and a charge of clay is again introduced by the feeding mechanism 100 and the operation is repeated.

I have described above the construction and operation of an embodiment of my invention, in which various steps in carrying out the same have been disclosed.

I will now proceed to describe the method of molding articles in accordance with my invention. The method consists in first lubricating the forming surfaces of the core by applying a coating of oil thereto. The material is fed in predetermined quantities into the molds as they pass a predetermined point in their cycle of travel about a common axis, the material being first coated with lubricant to lubricate the forming surfaces of the mold. The next step, according to my invention, consists in partially forming the material in the mold. Then, as the respective cores and molds are moved relatively away from each other, the cores are again coated with lubricant. The respective cores and molds are again relatively moved toward each other to complete the final molding operation, and as the cores and molds continue to travel through their cycle of movement, the cores are partially removed from the molds and the product may be lifted slightly from the mold, so that excess plastic material may be removed by means of a trimmer carried by the core, as shown clearly in Fig. 1.

Subsequent to the trimming operation the cores and molds continue in their travel and the articles within the molds may be ejected automatically at a predetermined point during such travel. My method may also contemplate as another step the removal of the finished articles from the molds to a point where they may be collected for drying. The cycle of operation may be repeated indefinitely.

It will thus be seen by my improved continuous method of molding articles such as flower pots or the like, that I have eliminated the tendency of the material to stick to the cores and molds and in this manner have provided a method which is capable of continuous operation for long periods of time.

While I have shown for purposes of illustration a mechanism carrying six molds and cooperating spindles, it is my intention to include any number of molds and spindles which may be found convenient for economic production. Various other modifications may be made in such an apparatus without departing from the spirit of my invention.

I claim:

1. A continuous molding mechanism comprising a support, a plurality of cooperating molds and cores continuously revoluble about said support, said cores and molds being relatively movable toward and away from each other to mold said material, means to supply a predetermined amount of material to said molds, means to discharge the molded material from said molds, and means for conveying the molded articles from the path of the molds, said means including a table and a deflector engageable with the article for transferring the same to said table all said means being operable during continuous revolution of the molds about said support.

2. A continuous molding mechanism comprising a support, a plurality of cooperating molds and cores continuously revoluble about said support, said cores and molds being relatively movable toward and away from each other to mold said material, means to supply a predetermined amount of material to said molds, means to discharge the molded material from said molds said means including, ejectors carried by the molds, and a deflector means for removing the ejected articles from the path of movement of the cores and molds, while the said molds and cores are revolving about said support.

3. A continuous molding mechanism comprising a support, a plurality of cooperating molds and cores continuously revoluble about said support, said cores and molds being relatively movable toward and away from each other to mold said material, means to supply a predetermined amount of material to said molds, means to discharge the molded material from said molds, said means including ejectors carried by the molds, means including said ejectors for partially ejecting the articles from the molds, a trimmer means rotatable relative to the article for removing excess material from the same while partially ejected, and a deflector means operable for removing the ejected article from the path of movement of the cores and molds while the molds are revolving about said support.

4. The method of continuously molding articles from plastic material, which includes first partially molding the material, then applying lubricant to the exposed surface of the material, finally molding the material, and then trimming excess and undesirable material from the molded material and removing the molded material from the molds and repeating the operation all while the molds are traveling along a closed path.

5. The method of continuously molding articles from plastic material, which includes first partially molding the material, then applying lubricant to the exposed surface of the material, finally molding the material, then trimming excess and undesirable material from the article, and automatically removing the articles from the molds and from the path of movement of the molds, all during continuous movement of the molds along said closed path and then repeating the operation.

6. The method of continuously molding articles from plastic material, which consists in partially molding the material, applying a coating of lubricant to said partially molded material, and then finally molding the material, and removing the molded material from the molds and repeating the operation all during movement of the molds along a closed path.

7. The method of continuously molding articles from plastic material, which includes partially molding the material, applying a coating of lubricant to said partially molded material, then molding the material, partially removing the molded material from the mold and trimming excess material from the same, and then removing the molded material from the mold and repeating the operation all during movement of the mold along a closed path.

8. The method of continuously molding articles from plastic material, which consists in partially molding the material, applying a coating of lubricant to said partially molded material, then finally molding the material, partially removing the molded material from the mold, trimming excess material from the same, and then finally removing the article from the mold all while moving the mold along a predetermined path, and automatically conveying the molded material away from the path of movement of the mold during travel of said molds along said path.

9. An apparatus for continuously forming articles from plastic material, including cooperating molds and cores for forming said clay said cores and molds being continuously movable along a closed path, ejectors in said molds to lift the formed product above the mold cavity, a discharge table movable synchronously with said molds and extending partially around a portion of each of the ejectors at predetermined relative positions of said discharge table and ejectors and means to move the molded product from said ejectors onto said table while the molds are moving along said path.

10. An apparatus for continuously forming articles from plastic material, including cooperating molds and cores for forming said material, said cores and molds being continuously movable along a closed path, ejectors in said molds to lift the formed product above the mold cavity, means associable with said ejectors at predetermined positions and forming a substantially continuous surface with a surface of said ejectors, and means to move said formed product relative to said ejectors across a portion of said continuous surface.

11. The method of continuously molding articles from plastic material, which includes first applying lubricant to the surface of said material, then partially molding the material, then applying lubricant to the partially molded material, then finally molding the material, and removing the molded material from the mold, said steps all being performed during the movement of the molds along a closed path.

12. The method of continuously molding articles from plastic material, which includes first applying lubricant to the surface of said material, then partially molding the material, then applying lubricant to the partially molded material, then finally molding the material, and then trimming excess material from the articles so formed, and removing the molded material from the molds all during movement of the molds along a given path.

13. A continuous molding mechanism comprising a support, a plurality of cooperating molds and cores, said molds and cores being revoluble about said support, each of said cores being in axial alignment with one of said molds and said molds and cores being axially relatively movable toward and away from each other while revolving about said support for molding the material, and means to supply a predetermined amount of material to each of said molds at a given position along the path of movement thereof about said support, said means including a moving table operable synchronously with said molds and having downwardly extending chutes extending over the path of the mold cavities, means to discharge the molded material from said molds along another portion of the path of movement thereof, means to remove the molded material from the path of movement of said molds, said means including a moving table extending into the path of movement of said molds, and means to move the molded material onto said table.

14. A continuous molding mechanism comprising a support and a plurality of cooperating molds and cores continuously revoluble about said support, each of said molds being in axial alignment with its cooperating core, and means to move said cores and molds relatively toward and away from each other to mold the material, ejector means carried by said molds for partially ejecting the molded articles from said molds along a portion of the path of movement of the molds, a trimmer engageable with said articles when partially ejected from the molds for removing excess material therefrom, means cooperating with said ejector means for entirely removing the articles from the molds along another part of the path of movement about the support, and means to remove the ejected articles from the path of movement of said cores and molds.

15. A continuous molding mechanism including a central support and a head continuously carried by said central support and rotatable thereabout, a plurality of rotatable cores carried by said head and rotating about their respective axes, cooperating molds in axial alignment with said cores respectively, supports for said molds mounted in said head and slidable vertically toward and away from said cores, a cam track coaxial with said central support, means carried by said mold supports and engaging said cam track for moving said molds toward and away from said cores, means to supply a predetermined amount of material to each of said molds at a given position along the path of movement thereof about said support, and means to discharge the molded material at another position along the path of movement of said molds.

16. A method of continuously molding articles from plastic materials, which includes applying lubricant to the material introducing the material into the molds and molding the material and automatically removing the molded material from the molds and from the path of movement of the molds all while said molds are continuously moving along a predetermined closed circuitous path.

17. A continuous method of molding articles from plastic material, which includes molding the material and partially ejecting the material from the molds and supporting the material in partially ejected position and trimming excess and undesirable material from the molded material while thus partially ejected and while said molds are moving along a predetermined closed path, and automatically removing the finished article from the molds and from the path of movement of said molds.

18. A continuous method of molding plastic material which includes continuously moving molds along a closed path and introducing a predetermined amount of material into each of said molds as it passes a given position in the path of movement and molding the material and trimming the excess and undesirable material from the articles thus formed along another portion of said path of movement, and automatically removing the finished article from the molds and the path of movement of the molds at another portion thereof.

19. A continuous method of molding articles from plastic clay which includes introducing a predetermined amount of clay into molds while continuously moving the molds along a predetermined circuitous path, and molding the material therein during passage along one portion of said path, and automatically removing the molded material from the molds and from the path of movement thereof along another portion of said path, and returning said molds to the first mentioned position and repeating the cycle of operation, all during continuous movement of said molds along said predetermined path.

20. In a continuous clay molding apparatus, a plurality of cooperating cores and molds continuously movable along a closed path of travel, each of said cores being in axial alignment with one of said molds, means for moving the respective cores and molds axially relatively toward and away from each other during movement thereof along said path, means for relatively rotating each core and its respective mold about their common axis during travel thereof along said closed path for molding material and ejector means for removing molded material from the mold cavities during travel of the molds along part of said path.

21. A continuous molding mechanism, comprising a support, a plurality of cooperating molds and cores, said molds and cores being revoluble about said support, each of said cores being in axial alignment with one of said molds and said molds and cores being relatively movable axially toward and away from each other for molding the material while revolving about said support, and means to supply a predetermined amount of material to each of the molds at a given position along the path of movement thereof about the support, said means including an element movable synchronously with said molds and extending over the path of movement of the mold cavities.

22. A continuous plastic material molding apparatus including a support, a plurality of molds and cooperating cores revoluble about said support, each core being in axial alignment with one of said molds and each core and its respective mold being relatively movable toward and away from each other, and means for relatively rotating each core and its respective mold about their common axis during revolution of said molds and cores about said support for molding material, ejectors operably associated with the molds for removing molded material from the mold cavities when the cores are separated from their respective molds, and means operable during revolution of the molds about said support for removing the molded material from the path of movement of the molds about said support.

23. A continuous molding mechanism for molding plastic materials comprising a plurality of molds, said molds being continuously movable along a closed path, cores axially aligned one with each mold and movable therewith along said path, each mold and its cooperating core being relatively movable toward and away from each other for molding the material, ejectors for discharging molded material from the respective mold cavities, and means to remove the molded material from the path of movement of the molds during continuous movement of said molds along said closed path, said means including a movable member adapted to receive the molded material from the molds during movement of the molds along said path.

24. In an apparatus for continuously forming articles from plastic material, cooperating molds and cores movable toward and away from each other for forming the material, said cores and molds being continuously movable along a closed path, means including ejectors in said molds to lift the formed product out from the mold cavity during movement of the molds along part of said path, a discharge table movable substantially synchronously with said molds, and means for moving the molded product from said ejectors onto said table while said molds are moving along said path whereby the molded material is removed from the path of the molds.

25. A continuous molding apparatus including a plurality of cooperating cores and molds continuously movable along a closed path, each mold and its cooperating core being relatively movable toward and away from each other for molding the material during movement along said path, ejectors for discharging molded material from the mold cavities and means for removing the molded material from the path of movement of the molds while the molds are continuously moving along said path, said means including an element having a material receiving surface movable in a direction substantially tangentially of the path of movement of the molded material while passing adjacent thereto, and means operable to move the molded material onto said surface while the surface is passing adjacent thereto.

26. A continuous molding apparatus including a plurality of cooperating cores and molds continuously movable along a closed path, each mold and its cooperating core being relatively movable toward and away from each other for molding the material during movement along said path, ejector means for discharging molded material from the mold cavities and means for removing the molded material from the path of movement of the molds, said means including a member having a material receiving surface movable into and out from the path of movement of the molds, and engageable with the material during continuous movement of said molds along said closed path.

27. In a continuous molding apparatus for molding plastic material, a plurality of co-operating molds and cores continuously movable along a closed path, each core being in axial alignment with one of said molds and relatively movable toward and away therefrom, and means for continuously revolving said cores about their respective axes during travel along said path, and means for moving said cores and molds relatively toward each other along part of said path for partially molding the material and for relatively separating the cores and molds before final molding position, and for returning them to final molding position during movement thereof along another portion of said path.

In testimony whereof, I hereunto affix my signature.

LOUIS J. FRIEDL.